April 15, 1924.

C. D. STEWART

VEHICLE BRAKE DEVICE

Filed May 5, 1921

INVENTOR
CARLTON D. STEWART
BY *Wm. M. Cady*
ATTORNEY

Patented Apr. 15, 1924.

1,490,140

UNITED STATES PATENT OFFICE.

CARLTON D. STEWART, OF BERKELEY, CALIFORNIA, ASSIGNOR TO THE WESTINGHOUSE AIR BRAKE COMPANY, OF WILMERDING, PENNSYLVANIA, A CORPORATION OF PENNSYLVANIA.

VEHICLE BRAKE DEVICE.

Application filed May 5, 1921. Serial No. 467,042.

*To all whom it may concern:*

Be it known that I, CARLTON D. STEWART, a citizen of the United States, residing at Berkeley, in the county of Alameda and State of California, have invented new and useful Improvements in Vehicle Brake Devices, of which the following is a specification.

This invention relates to brakes, and more particularly to a motor vehicle brake apparatus.

The principal object of my invention is to provide means operable by the foot for controlling both the power and the vehicle brakes.

Figure 1:
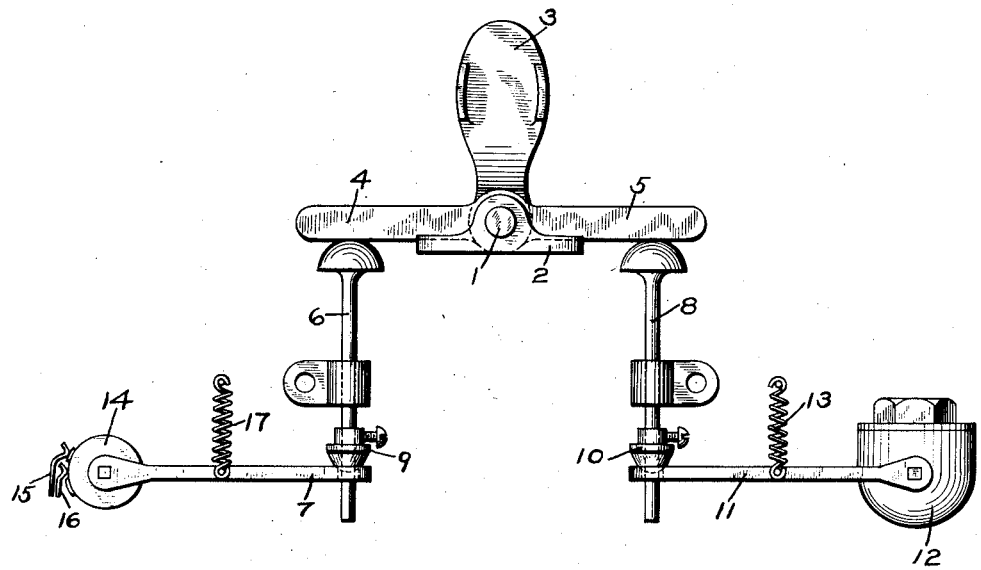
Figure 2:
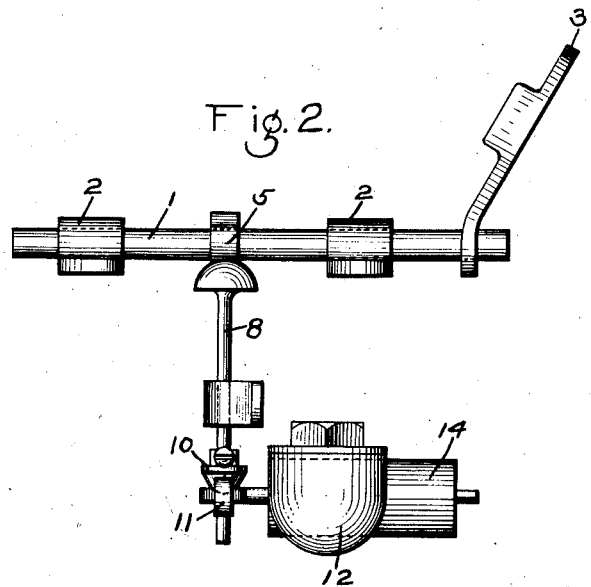

In the accompanying drawing; Fig. 1 is a diagrammatic view of a combined power and brake controlling mechanism embodying my invention; and Fig. 2 a side elevation of the construction shown in Fig. 1.

According to a preferred form of my invention, a shaft 1 is mounted in suitable bearing blocks 2 and secured to said shaft is a foot pedal 3 and a member having rocker arms 4 and 5.

The arm 4 engages a push rod 6 having an adjustable stop 9 for engaging a lever 7 through the movement of which the brakes are controlled and the arm 5 engages a push rod 8 having an adjustable stop 10 for engaging a lever 11, the movement of which is adapted to control the power of the vehicle.

The movement of lever 11 may operate a carburetor 12 of the usual construction and is acted upon by a coil spring 13, tending to press the lever against the stop 10.

The movement of lever 7 may operate to control various types of brakes, such as pneumatic and electro-pneumatic, and for the purpose of illustration, I have shown the lever 7 as operating a contact drum 14 having contacts adapted to engage contact fingers 15 and 16 for controlling electric circuits of a brake system, such as that set forth in my pending application, Serial No. 467,041, filed May 5, 1921.

The position of the foot pedal 3 as shown in Fig. 1 may be termed the neutral position and said pedal is normally maintained in this position by the action of the springs 13 and 17.

In operation, movement of the pedal 3 to the right by the application of the foot, causes the arm 5 to depress the push rod 8 and thereby effect the movement of the lever 11, so that the carburetor 12 is operated to vary the power of the vehicle in the usual manner.

Movement of the pedal 3 from neutral position to the left causes the arm 4 to depress the push rod 6 and thereby effect the movement of the lever 7 and the rotation of the drum 14.

As in my prior application, hereinbefore mentioned, this movement operates to close a circuit through an application magnet for effecting the application of the brakes.

If the pedal 3 is then shifted from its extreme left hand position partly toward neutral or release position. the brakes may be held applied, or if it is desired to release the brakes, the pedal may be returned to neutral position, in which the release magnet is energized to effect the release of the brakes.

It is not deemed necessary to illustrate the brake apparatus since it will be evident that the movement of the lever 7 may be readily utilized for that purpose and furthermore a complete brake apparatus suitable for control by movement of the drum 14 is set forth in my pending application, hereinbefore referred to.

Having now described my invention, what I claim as new and desire to secure by Letters Patent, is:

1. In a motor vehicle control, the combination with a rotatable foot operated member comprising a foot engageable element and oppositely disposed arms, of means operated by the movement of one arm for controlling the power of the vehicle and means operated by the movement of the other arm for controlling the vehicle brakes.

2. In a motor vehicle control, the combination with a rotatable foot operated member comprising a foot engageable element and oppositely disposed arms, of means operated by one arm upon movement of said member in one direction for controlling the application of power to the vehicle and means operated by the other arm upon movement of said member in the opposite direction for controlling the vehicle brakes.

3. In a motor vehicle control device, the combination with a foot pedal movable by a lateral movement of the foot in either direction and oppositely extending arms rigidly connected to said pedal, of means operable by one arm for controlling the power of the vehicle and means operable by the other arm for controlling the brakes.

4. In a motor vehicle control, the combination with a push rod for controlling the application of power to the vehicle and a push rod for controlling the vehicle brakes, of a shaft, a rocker arm secured to said shaft for engaging each push rod, and a foot operated pedal for operating said shaft.

In testimony whereof I have hereunto set my hand.

CARLTON D. STEWART.